R. H. FEWSTER.
LOCK NUT.
APPLICATION FILED FEB. 28, 1918.
1,317,567.
Patented Sept. 30, 1919.
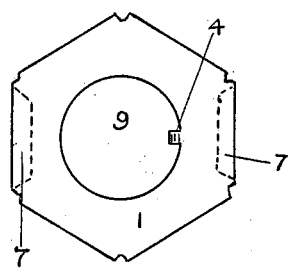
FIG 1
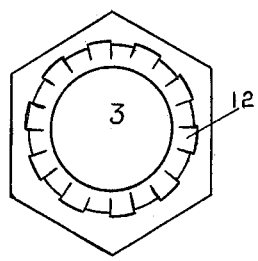
FIG 4
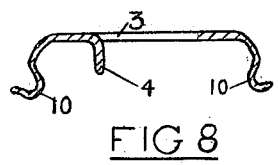
FIG 8
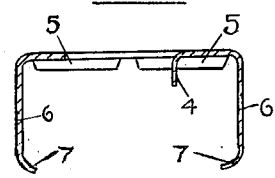
FIG 2
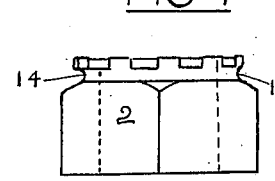
FIG 5
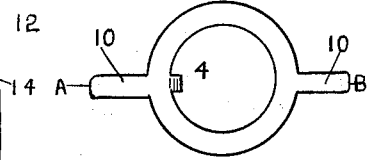
FIG 7
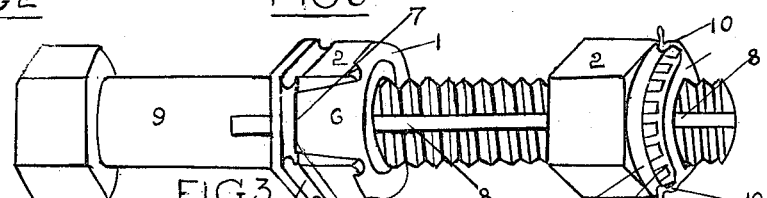
FIG 3
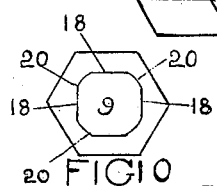
FIG 10
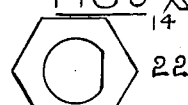
FIG 12
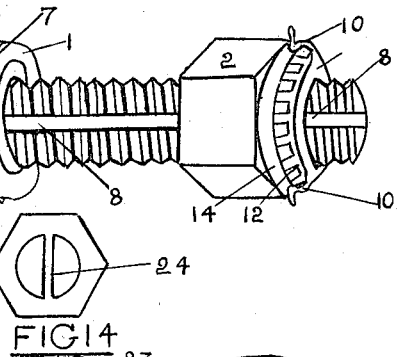
FIG 14
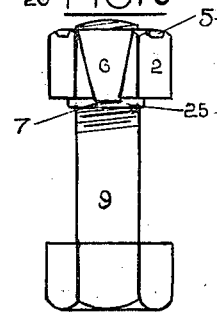
FIG 9
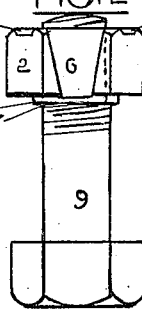
FIG 11
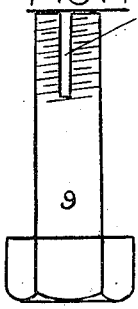
FIG 13
FIG 6
INVENTOR
Robert Horwood Fewster
BY
ATTORNEYS

UNITED STATES PATENT OFFICE.

ROBERT HORWOOD FEWSTER, OF DARKAN, WESTERN AUSTRALIA, AUSTRALIA.

LOCK-NUT.

1,317,567.  Specification of Letters Patent.  Patented Sept. 30, 1919.

Application filed February 28, 1918. Serial No. 219,689.

*To all whom it may concern:*

Be it known that I, ROBERT HORWOOD FEWSTER, a subject of the King of Great Britain, and resident of Darkan, in the State of Western Australia, Commonwealth of Australia, have invented certain new and useful Improvements in Lock-Nuts, of which the following is a specification.

This invention relates to improved means for effectively securing and adjusting bolts and nuts and like devices on parts of machines of large and small dimensions and in various positions and conditions. One of the objects of the invention is to allow the positioning and adjustment of nuts upon a bolt or bar without necessary contiguity to other fixed parts of the machine or permanent structure. Another object is to enable the tightness of the nut and bolt to be adjusted easily, effectively and to a fine degree. The invention affords means for preventing the rotation of a bolt or loosening of a nut. The invention comprises a cap washer designed and adapted to effectuate the foregoing purpose, while the cap washer and parts are constructed in such a manner that they can be used continually and perpetually, the parts not being destroyed by changing operations. My device differs in this respect from other locking devices the nearest to it in similarity so far as I am aware. The cap washer is of such varied shape and construction that it fits over or on and off the nut and is adapted to clutch the same. The cap washer is furnished interiorly with either a lug fitting into a groove lengthwise of the bolt; or the washer is constructed with a bar extending from one of its sides diametrically to the opposite side and fitting into a slot across the center of the bolt corresponding with the said bar; or the bolt is provided with a flattened or modified portion or portions which correspond and co-act with like portion or portions of the cap washer.

This device secures practically the positive immobility of adjusted nuts. It also allows of most perfect adjustment from time to time to any degree of fineness. It can be used in all positions where nuts and the like are required and can be easily applied while it enables greater convenience and security to be obtained.

Embodiment with modification of forms of the invention may be described as follows: A cap washer which is a combination of a washer extended to the form of a cap is formed of durable suitable material, such as preferably spring steel. In one form the cap washer has extended flange lugs which fit into radial slots or faces on the nut. Two of these lugs are prolonged and curved downward (meaning in line with the length of the bolt) and inward at or near their ends so that they can slide down the sides or faces of the nut where they slip into an approximately annular groove or recess or reduced portion thereby securing the cap washer on the nut. It can be readily removed by inserting the ends of flat tongs under the lugs and so slipping the cap off. In order to prevent the nut with the described or similar attachments from slackening, a key way is cut through the top or along the bolt, a tongue or lug being provided on the interior of the cap washer, such tongue or lug being bent to follow the course of the key way for such distance inward as is advisable according to the diameter of the bolt.

In another form of the invention the washer is square or flat either on one or more of its sides a corresponding squaring or flattening (which may be by recessing) being provided in the bolt. Or as another modification a slot is provided in the end of the bolt and a bar across the diameter of the cap washer. The word "bolt" in this specification is intended to describe a bolt with a head at one end and a screw threaded portion at the other end prepared to receive a nut and the bolt and nut are used for the purpose of securing and adjusting parts of machines or appliances. When extreme fineness of adjustment is required an adjunct is made to the nut containing several radial slots as herein described. In this specification the word "along" is used to describe the direction from screwed end of bolt toward its head.

The invention is applicable to heavy parts of machines as well as bolts and portable parts to which the term is more commonly applied.

In order that my invention may be fully understood I will describe the same with reference to the accompanying drawings in which—

Figure 1 is a top view of a hexagon nut washer according to this invention.

Fig. 2 is sectional view of same through its diameter.

Fig. 3 is an isometrical view of two washer caps *in situ* one showing the approximately annular groove around the nut and the turned in parts of washer which clutch the groove edge of the nut.

Fig. 4 is a view of a nut which has an adjunct the face of which contains a number of regulating radial slots.

Fig. 5 is a side view of same.

Fig. 6 and Fig. 7 in plan show another form of cap washer having two spring clutch fingers one on each side but without the flaps shown in previous illustrations.

Fig. 8 is a section through the line A—B of Fig. 7.

Fig. 9 is an elevation and Fig. 10 a top view of bolt with squared sides and cap washer having squared sides to its interior aperture.

Figs. 11 and 12 are views of a bolt with one side of its threaded end squared and cap washer corresponding thereto.

Figs. 13 and 14 show a bolt with central flat sided groove and cap washer corresponding thereto.

In the drawings a hexagon nut is shown but the invention applies equally to other kinds of nuts. The cap washer is necessarily made to suit the nut and to be used with the same.

The cap washer 1 fitting over the nut 2 will now be described. It has a hole to correspond with the bolt and nut 2, but containing a detent member 4 for the purpose hereinafter described. The washer is made larger than the nut and is bent down in flaps which may be of various shapes such as 5—6 so as to clutch the nut. The cap washer will have as many flaps as there are sides to the nut. Two of the flaps 6 are extended farther and bend or turn under into the groove 14 made in the nut. Instead of a groove the nut may be recessed as shown in Fig. 9 and the flaps turned under the edge as at 7. In operation the bolt or butt and the nut are placed in their required position. The cap washer which is constructed of durable suitable material such as spring steel is placed over the nut and simply pushed home and turned slightly by which the detent 4 enters the groove 8 in the bolt 9 and the bolt and nut are thereby secured and held and prevented from loosening. The cap washer is made of size and temper such as to enable it in ordinary sizes to be easily pushed down into place. It can be readily removed by inserting the ends of flat tongs under the prolonged flanges and thus slipping them off. In larger machine parts—to which as well as portable parts the invention is applicable—the cap washer is made of thicker material and supplementary means may be employed for placing and removing when such may be found desirable.

In Figs. 4 to 8 the form of cap washer 1 which is illustrated has not the number of side flaps such as heretofore referred to, but after being placed in operative position is held and secured by the flanges or lugs 10 each of which passes over one of the radial slots 12, then bending under into the groove or recess 14, the end of the lugs being elongated for convenient manipulation in placing and removing. After the nut has been adjusted on the bolt to the desired tightness the washer is pushed home to its position as shown in Fig. 3. The detent 4 enters the groove 8 and the lugs 10 engage the slots 12 so that the nut is secured in its position on the bolt and loosening is prevented.

In Figs. 9 and 10 there is illustrated a cap washer of another modified form. In lieu of the groove 8 and detent 4 the screw part of the bolt is formed with flattened sides 18. There are four in the illustration but there might be a less number. The washer is also formed with four flat sides to correspond with 18. The washer is retained on the nut in the same manner as described with reference to Figs. 1 and 2. Its interior four flat sides are dimension to pass easily over the bolt 9. The bolt engages the thread of the nut with its rounded portions 20. The washer by means of its flat sides engages the flat sides of the bolt and securely holds the same and prevents loosening. The washer is placed and removed in the manner before described. A recess 25 affords means for the ends of flaps to be turned thereunder to clutch the nut.

In Figs. 11 and 12 the bolt 9 is formed with one flattened side and the cap washer 1 with a flattened side 22 extended either upwardly or downwardly. Other parts of the cap washer are formed as hereinbefore described and as illustrated.

In Figs. 13 and 14 the flattened portion of the bolt is provided by means of a slot cut diametrically therethrough as at 23 and the washer 1 is provided with a bar 24 which engages with the slot and holds the nut securely in its position on the bolt and prevents loosening.

By means of this invention the nut can be adjusted to almost any degree of fineness. Where extreme fineness is required many grooves or faces or slots may take the place of or be added to the ordinary sides of the nut which have usually from four to eight sides. By the above means there can be obtained twelve or more gradations.

I claim:

1. A detent cap washer of spring plate steel or metal adapted to surround a bolt or shaft and having a flat inwardly extending lug detent member adapted to engage a longitudinal groove in the bolt or shaft such cap washer having exteriorly two gripping lugs, said lugs extending downwardly and inwardly and then curved outward and adapted to engage and grip two of a plurality of recesses formed in or upon a nut substantially as described and illustrated.

2. In a nut lock, a bolt having a longitudinal groove, a nut on the bolt and having radial slots in its upper face and recesses in its sides, and a cap washer of spring material and formed with an inwardly extending lug for engaging the groove of the bolt and two lugs for engaging the slots and recesses of the nut, said lugs extending downwardly and inwardly and then curved outwardly.

In witness whereof I have hereunto set my hand at Perth, in the State of Western Australia, this fifteenth day of January 1918, in the presence of two subscribing witnesses.

ROBERT HORWOOD FEWSTER.

Witnesses:
E. TINDAL,
JM. TURNER.

Copies of this patent may be obtained for five cents each, by addressing the "Commissioner of Patents, Washington, D. C."